United States Patent
Lee et al.

(10) Patent No.: US 7,687,975 B2
(45) Date of Patent: Mar. 30, 2010

(54) VIBRATION ASSISTED MACHINING SYSTEM WITH STACKED ACTUATORS

(75) Inventors: Tzehin Lee, Newton, MA (US); Jon Ethington, Gloucester, MA (US)

(73) Assignee: Panasonic Corporation, Osaka (JP)

(*) Notice: Subject to any disclaimer, the term of this patent is extended or adjusted under 35 U.S.C. 154(b) by 310 days.

(21) Appl. No.: 11/691,844

(22) Filed: Mar. 27, 2007

(65) Prior Publication Data
US 2008/0238255 A1 Oct. 2, 2008

(51) Int. Cl.
*H02N 2/12* (2006.01)
(52) U.S. Cl. .................... 310/323.18; 310/328
(58) Field of Classification Search ..................
310/323.01–323.21, 328
See application file for complete search history.

(56) References Cited

U.S. PATENT DOCUMENTS

| | | | |
|---|---|---|---|
| 4,724,318 A * | 2/1988 | Bennig | 850/7 |
| 6,617,761 B2 * | 9/2003 | Ando et al. | 310/328 |
| 6,637,303 B2 | 10/2003 | Moriwaki et al. | |
| 7,352,110 B2 * | 4/2008 | Hess | 310/328 |
| 2002/0152851 A1 | 10/2002 | Moriwaki et al. | |
| 2004/0077293 A1 | 4/2004 | Kostar et al. | |
| 2007/0052326 A1 | 3/2007 | Liu | |

FOREIGN PATENT DOCUMENTS

| | | |
|---|---|---|
| DE | 915 769 C | 7/1954 |
| EP | 0 979 700 A2 | 2/2000 |
| EP | 1 234 627 A2 | 8/2002 |
| EP | 1 762 305 A2 | 3/2007 |
| JP | 62 034759 A | 2/1987 |
| JP | 2002 036001 A | 2/2002 |

OTHER PUBLICATIONS

Brocato, Brett C; "Micromachinging Using Elliptical Vibration Assisted Machining (EVAM)", 2005.*
Nobuhiko Negishi et al., "High Speed Vibration Assisted Maching," pp. 157-174.
Nobuhiko Negishi et al., "Elliptical Vibration Assisted Diamond Turning."
Thomas A Dow, et al., Vibration Assisted Diamond Turning Using Elliptical Tool Motion.
Nobuhiko Negishi et al., "Rapid Diamond Milling," pp. 129-140.
Thomas A Dow et al., Elliptical Vibration Assisted Diamond Turning.
International Search Report Dated Jul. 8, 2008.

* cited by examiner

*Primary Examiner*—Walter Benson
*Assistant Examiner*—Derek J Rosenau
(74) *Attorney, Agent, or Firm*—RatnerPrestia (57) ABSTRACT

A vibration assisted machining (VAM) system, including: a frame; a vibration element mechanically coupled to the frame; a cutting tool holder connected to the vibration element; and a workpiece holder coupled to the frame. The vibration element includes a first piezoelectric (PZT) actuator and a second PZT actuator, which are adapted to generate a substantially elliptical tool path in a vibration plane of the VAM system. The VAM system also includes a third PZT actuator coupled between the frame and either the vibration element or the workpiece holder. This third PZT actuator is coupled to the frame such that its polarization axis is substantially in the vibration plane and substantially perpendicular to the feed direction of the VAM system.

11 Claims, 12 Drawing Sheets

VIBRATION ASSISTED MACHINING SYSTEM WITH STACKED ACTUATORS

FIELD OF THE INVENTION

The present invention concerns vibration assisted machining (VAM) systems with stacked actuators. These VAM systems may allow for the manufacture of devices having improved surface finish quality, reduced feature sizes, and increased dimensional complexity. They may also allow for more rapid manufacture of device.

BACKGROUND OF THE INVENTION

Vibration assisted machining (VAM) is an advanced manufacturing technique that is utilized in various applications such as manufacturing master molds for gratings and diffractive optics and die masters for stamping. VAM techniques may provide advantages, including: decreased tool wear; expanded material machining capability; and increased nanoscale feature capabilities, as compared to single point turning machining.

VAM further enables machining of materials, such as, for example, silicon carbide, that are extremely difficult to machine using single point diamond turning techniques due to excessive heating of the diamond tip. VAM systems vary in complexity and utility. VAM systems, such as the Ultramill system developed at North Carolina State University, use two piezoelectric (PZT) actuators mounted sided by side to drive a diamond tool in an elliptic trajectory. The minor and major axes of the ellipse trajectory are determined by a T-shaped linkage used to couple the PZT actuators to the cutting tool and the amplitude and phase of the drive signals used to drive the PZT actuators. However, this linkage geometry and driving method does not allow for reduced tool lead-in and lead-out zones (i.e., transition zones) when entering or exiting a workpiece when operated in a steady-state condition.

SUMMARY OF THE INVENTION

The present invention provides an improved vibration milling apparatus and method for machining hard materials to produce high quality surface finishes and may provide for reduced tool lead-in and lead-out zones, while maintaining other desirable features associated with VAM processing.

An exemplary embodiment of the present invention is a vibration assisted machining (VAM) system, including: a frame; a vibration element mechanically coupled to the frame; a cutting tool holder connected to the vibration element; and a workpiece holder coupled to the frame. The vibration element includes a first piezoelectric (PZT) actuator and a second PZT actuator, which are adapted to generate a substantially elliptical tool path in a vibration plane of the VAM system. The VAM system also includes a third PZT actuator coupled between the frame and either the vibration element or the workpiece holder. This third PZT actuator is coupled to the frame such that its polarization axis is substantially in the vibration plane and substantially perpendicular to the feed direction of the VAM system.

Another exemplary embodiment of the present invention is a VAM system, including: a frame; a cutting tool holder; a workpiece holder coupled to the frame; and three PZT actuators. The first PZT actuator is coupled between the frame and either the cutting tool holder or the workpiece holder. The second PZT actuator is also coupled between the frame and either the cutting tool holder or the workpiece holder. The third PZT actuator is coupled between the frame and one of the first two PZT actuators, between the frame and the cutting tool holder, or between the frame and the workpiece holder. The first and second PZT actuators are adapted to drive a cutting tool mounted in the cutting tool holder in a substantially elliptical tool path in the vibration plane of the VAM system. The first and third PZT actuators are coupled to the frame such that their polarization axes are substantially in the vibration plane and substantially perpendicular to the feed direction of the VAM system. The second PZT actuator is coupled to the frame such that its polarization axis is in the vibration plane and substantially parallel to the feed direction of the VAM system.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawing are the following figures.

DETAILED DESCRIPTION OF THE INVENTION

Figure 2:
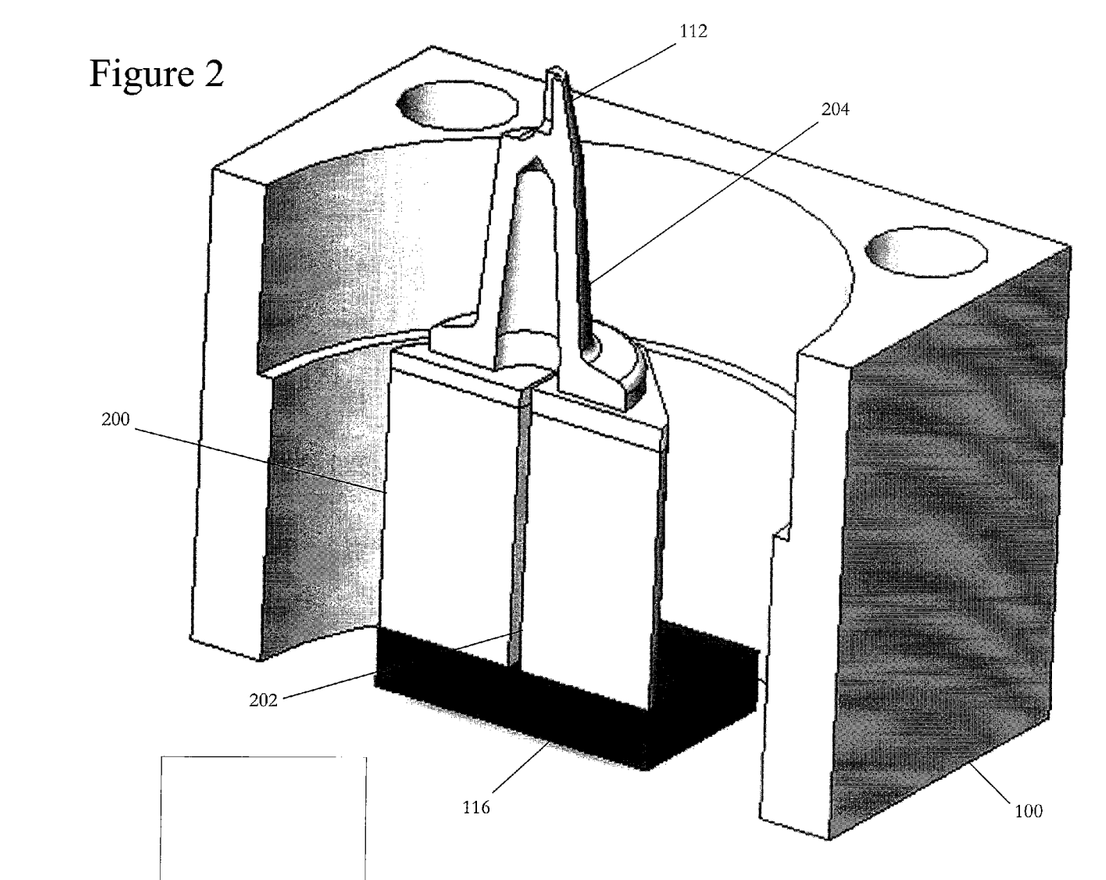
FIG. 2 is a cut-away perspective drawing illustrating an exemplary stacked actuator configuration that may be used in exemplary VAM system according to the present invention.

One current VAM system design uses two piezoelectric (PZT) stacks/actuators arranged in a side-by side configuration (similar to the configuration of PZT's 200 and 202 in FIG. 2). In the following detailed description of the present invention, many of the examples specifically illustrate a vibration element including two PZT actuators arranged in this side-by side configuration. However, one skilled in the art will understand that the use of this particular vibration element is merely illustrative and is not intended to be limiting. It is contemplated that other two PZT actuator vibration elements known in the art (such as those illustrated in FIGS. 6A, 6B, 7A, 7B, and 8) may be used in exemplary embodiments of the present invention.

In VAM systems that use vibration elements with the side-by side configuration, the vibration elements are driven by applying sinusoidal voltage signals to the two PZT's that have frequencies of about 1-4 kHz and that are 60-170° g out of phase with one another; however a 90° phase difference between the signals is commonly used. The oscillation of the two actuators, when coupled through a "T" linkage, creates an elliptical cutting tool motion. This motion limits the entrance/transition zone to half the length of the ellipse, and also limits the maximum feed rate during cutting that may be used to achieve a desired surface finish. Due to the curved profile of the ellipse, the feed rate is governed by the desired peak-to-valley value of this surface finish. It is noted that the resulting surface has a substantially scalloped appearance under high magnification. The length and height scales of this scalloped pattern are substantially related to the upfeed rate per ellipse cycle and equivalent radius estimate for the ellipse shape.

Exemplary embodiments of the present invention add a third short stroke PZT actuator to the side-by-side PZT actuators. The third PZT actuator may also be driven with a sinusoidal voltage signal. The phase, frequency, and/or amplitude of this third drive signal may be varied to alter the resulting elliptical motion of the tip of the cutting tool to different shapes, as referenced by the intended cutting surface. The tool motion "seen" by the workpiece will dictate performance characteristics. Some of these altered tool path shapes may allow for faster feed rates, while others may allow for deeper cuts to be made in a single pass.

Figure 1:
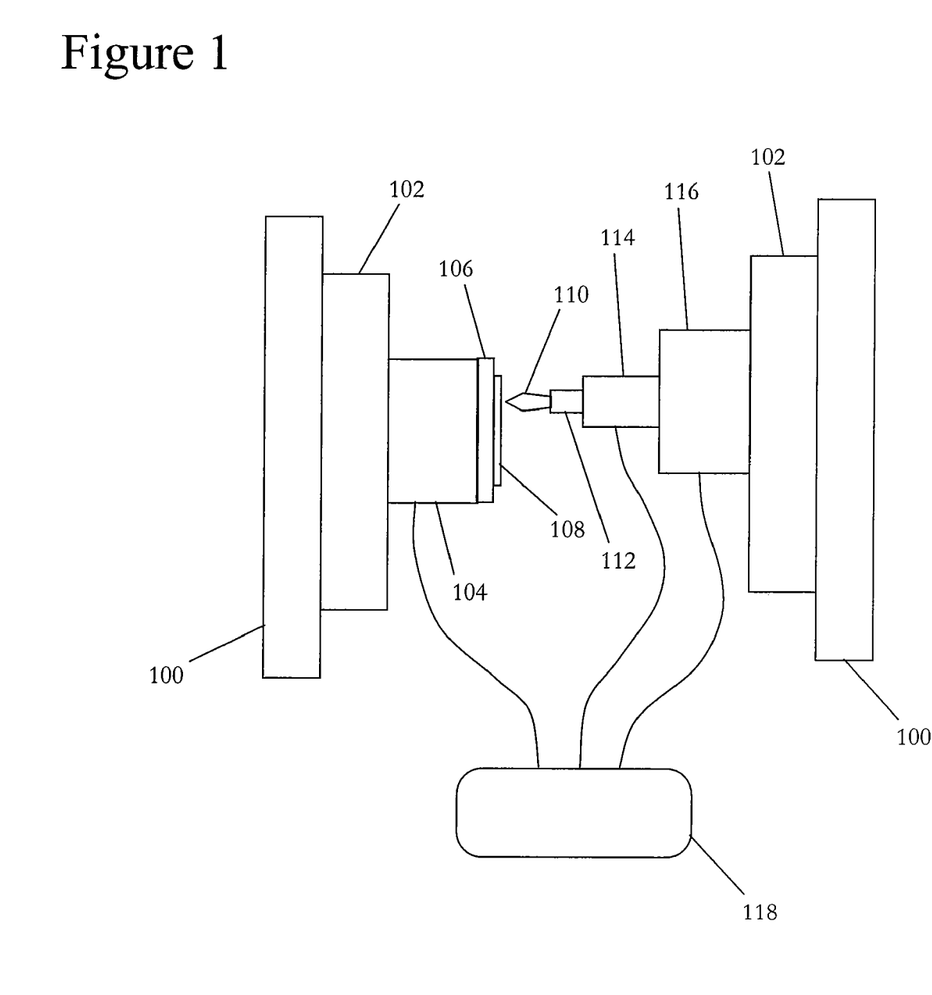
FIG. 1 is a side plan drawing illustrating an exemplary vibration assisted machining (VAM) system according to the present invention.

FIG. 1 illustrates an exemplary embodiment of the present invention. This exemplary embodiment is a VAM system that includes: frame 100; vibration element 114, which includes two PZT actuators mounted in a side-by-side configuration; cutting tool holder 112; workpiece holder 106; and a third, perturbation, PZT actuator. The perturbation PZT actuator may be coupled between frame 100 and either vibration element 114 (PZT actuator 116), workpiece holder 106 (PZT actuator 104), or both. FIG. 1 also illustrates a workpiece 108 mounted in workpiece holder 106 and additional elements that may be included in an exemplary VAM system according to the present invention such as: cutting tool 110; motion stages 102 to move workpiece 108 and/or cutting tool 110 relative to each other to during the machining of workpiece 108; and vibration control circuitry 118 to provide the drive signals for vibration element 114 and perturbation PZT actuator 104 and/or perturbation PZT actuator 116.

Frame 100, motion stage(s) 102, workpiece holder 106, vibration element 114, cutting tool holder 112, and cutting tool 110 may all be similar to the corresponding elements of prior art VAM systems, such as the Ultramill developed at North Carolina State University. Cutting tool 110 may typically include a diamond tip; however, other cutting tool tips, such as carbides or sapphire, may desirably be used depending on the material to be machined.

Motion stages 102 may each include feed stages and/or step stages to move workpiece 108 and/or cutting tool 110. These feed and step stages desirably provide motion in orthogonal directions that are substantially parallel to the surface of workpiece 108 (and also substantially orthogonal to the polarization axes of the perturbation PZT actuators) to provide a raster scan machining pattern. It is noted that motion stage(s) 102 may also include a Z translation stage to control the cutting depth (during machining of the surface of workpiece 108) and the separation between workpiece 108 and the tip of cutting tool 110 (when the surface of workpiece 108 is not being machined). Other motion stages include rotation and tilt stages may also be included in motion stage(s) 102 to allow additional degrees of freedom and/or alternative machining patterns.

Figure 5A:
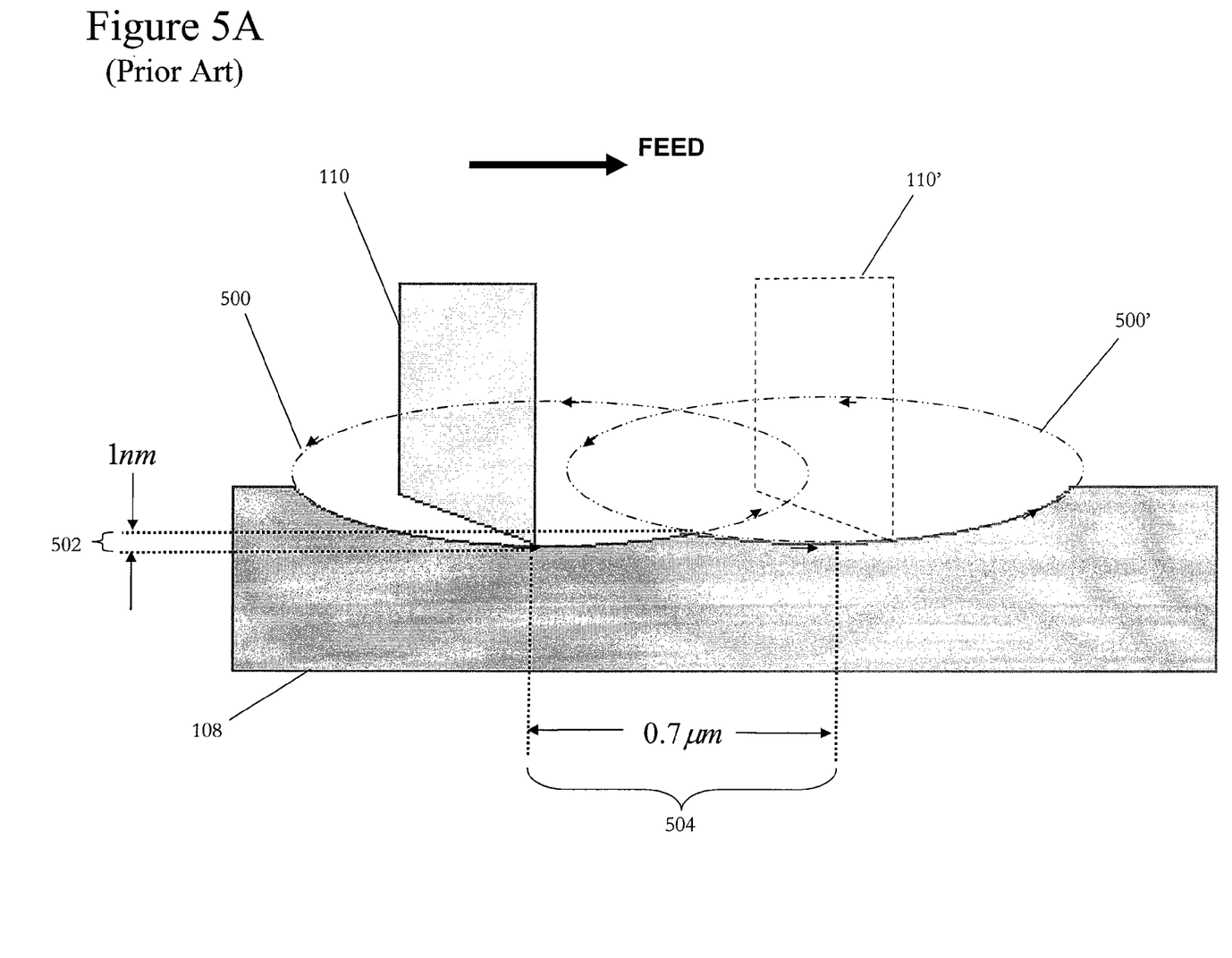
FIG. 5A is a side plan drawing illustrating an exemplary surface finish and feed rate attained using a prior art VAM system.

FIG. 2 is an enlarged cutaway perspective drawing illustrating an exemplary configuration of vibration element 114, cutting tool holder 112 and perturbation PZT actuator 116. This Figure illustrates the side-by-side configuration of PZT actuators 200 and 202, i.e. the polarization (displacement) axes of these two PZT actuators are substantially parallel (up and down the page in FIG. 2, left and right in FIG. 1). These two PZT actuators are coupled together by T-linkage 204 to form a vibration element, which may be used as vibration element 114 in the exemplary VAM system of FIG. 1. As discussed above, driving PZT actuators 200 and 202 with sinusoidal signals causes the tip of a cutting tool mounted in cutting tool holder 112 to follow a substantially elliptical tool path (as shown in FIG. 5A) which is in a plane substantially parallel to the feed direction of the VAM system. (This plane is often substantially perpendicular to the surface of workpiece 108 being machined.) By varying the amplitudes of these sinusoidal signals, and/or their phase difference, the orientation and ellipticity of this elliptical tool path may be varied, including fully circular; however, the tool path of the tool tip remains substantially elliptical as long as PZT actuators 200 and 202 are driven with sinusoidal drive signals.

Figure 6A:
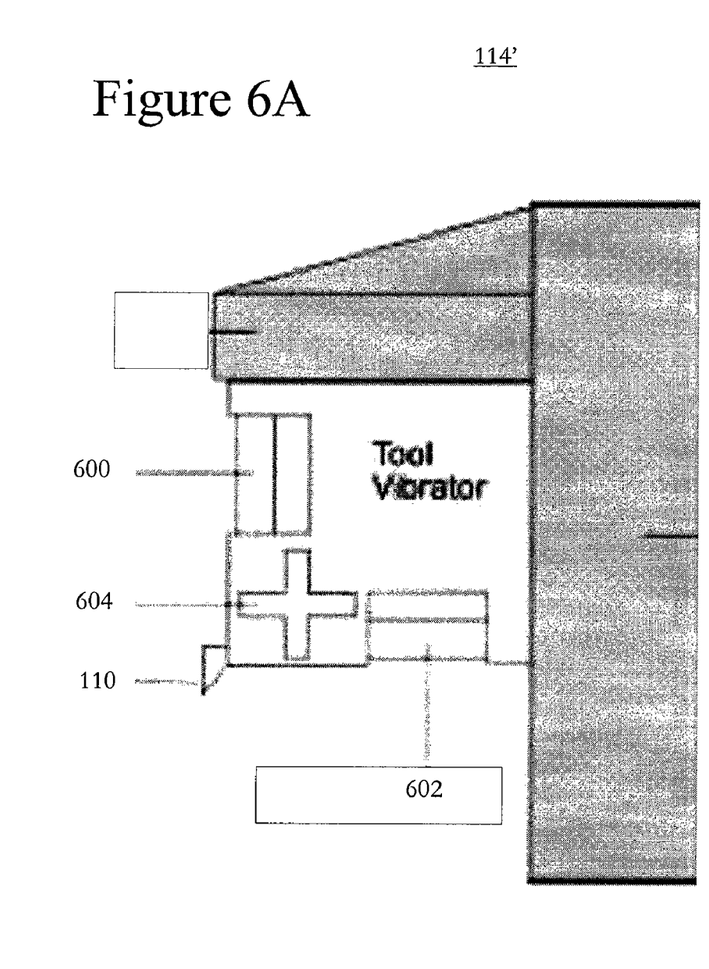
FIG. 6A is a side plan drawing illustrating a vibration element that may be used in exemplary VAM systems according to the present invention.
Figure 6B:
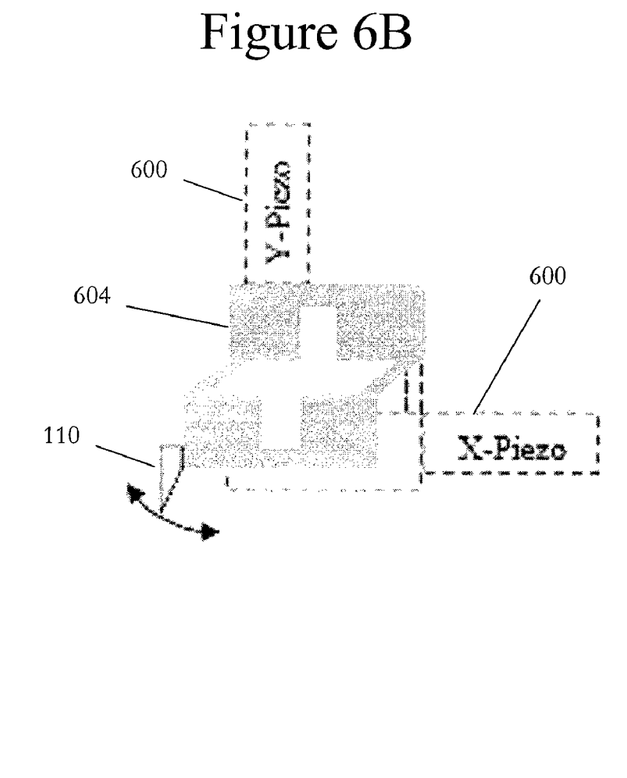
FIG. 6B is a side plan drawing illustrating operating principles of the cross-void flexure of the vibration element of FIG. 6A.

FIG. 6A illustrates alternative vibration element 114'. This exemplary vibration element uses orthogonally mounted PZT actuators 600 and 602 to deform cross-void flexure 604. These deformations cause cutting tool 110 to travel along a curved path, as shown in FIG. 6B. By driving the two PZT actuators 600 and 602 with sinusoidally varying signals that have the same frequency and are out of phase, this curved path becomes a closed ellipse. As in the exemplary vibration element of FIG. 2, by varying the amplitudes of these sinusoidal signals, and/or their phase difference, the orientation and ellipticity of this elliptical tool path may be varied, including fully circular; however, the tool path of the tool tip remains substantially elliptical as long as PZT actuators 200 and 202 are driven with sinusoidal drive signals.

Figures 7A, 7B:
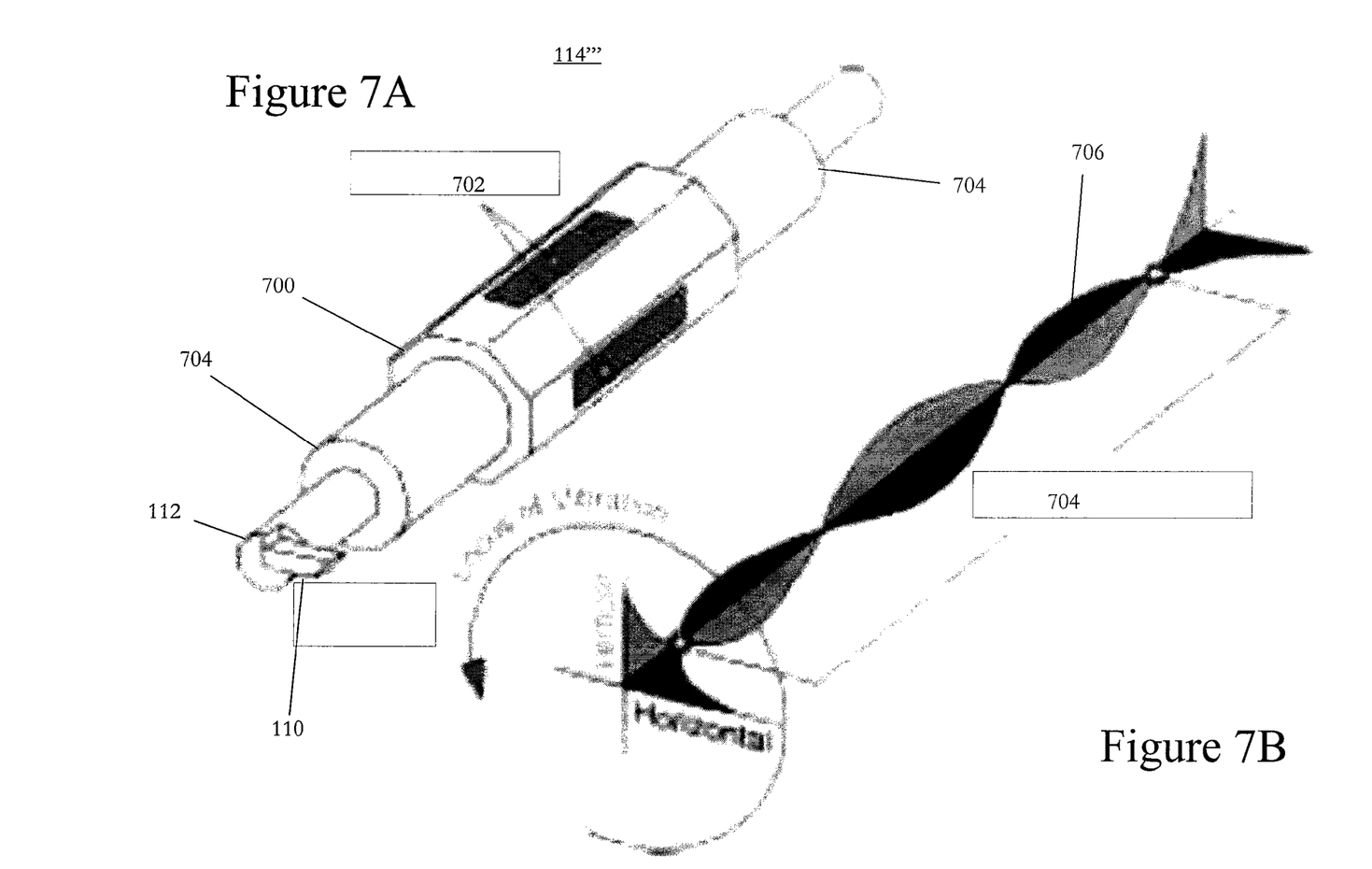
FIG. 7A is a perspective drawing illustrating another vibration element that may be used in exemplary VAM systems according to the present invention.
FIG. 7B is a graph illustrating operating principles of the vibration element of FIG. 7A.

FIG. 7A illustrates another alternative vibration element 114". This exemplary vibration element uses orthogonally mounted PZT actuators 702 to set up oscillations in two-dimensional vibration beam 700. Two-dimensional vibration beam 700 is rigidly coupled at coupling points 704. Thus, as shown in FIG. 7B, transverse standing waves 706, with nodes corresponding to coupling points 704, may be driven by PZT actuators 702, which are coupled to two-dimensional transverse vibration beam 700 a center point between the two coupling points 704. The end portion two-dimensional vibration beam 700, which is adapted to function as cutting tool holder 112, is vibrated by these standing waves. These vibrations may cause the tip of cutting tool 110 to follow an elliptical tool path. The ellipticity and orientation of this elliptical tool path may be controlled by varying the relative amplitudes and phases of the orthogonal components of transverse standing waves 706.

Figure 3A:
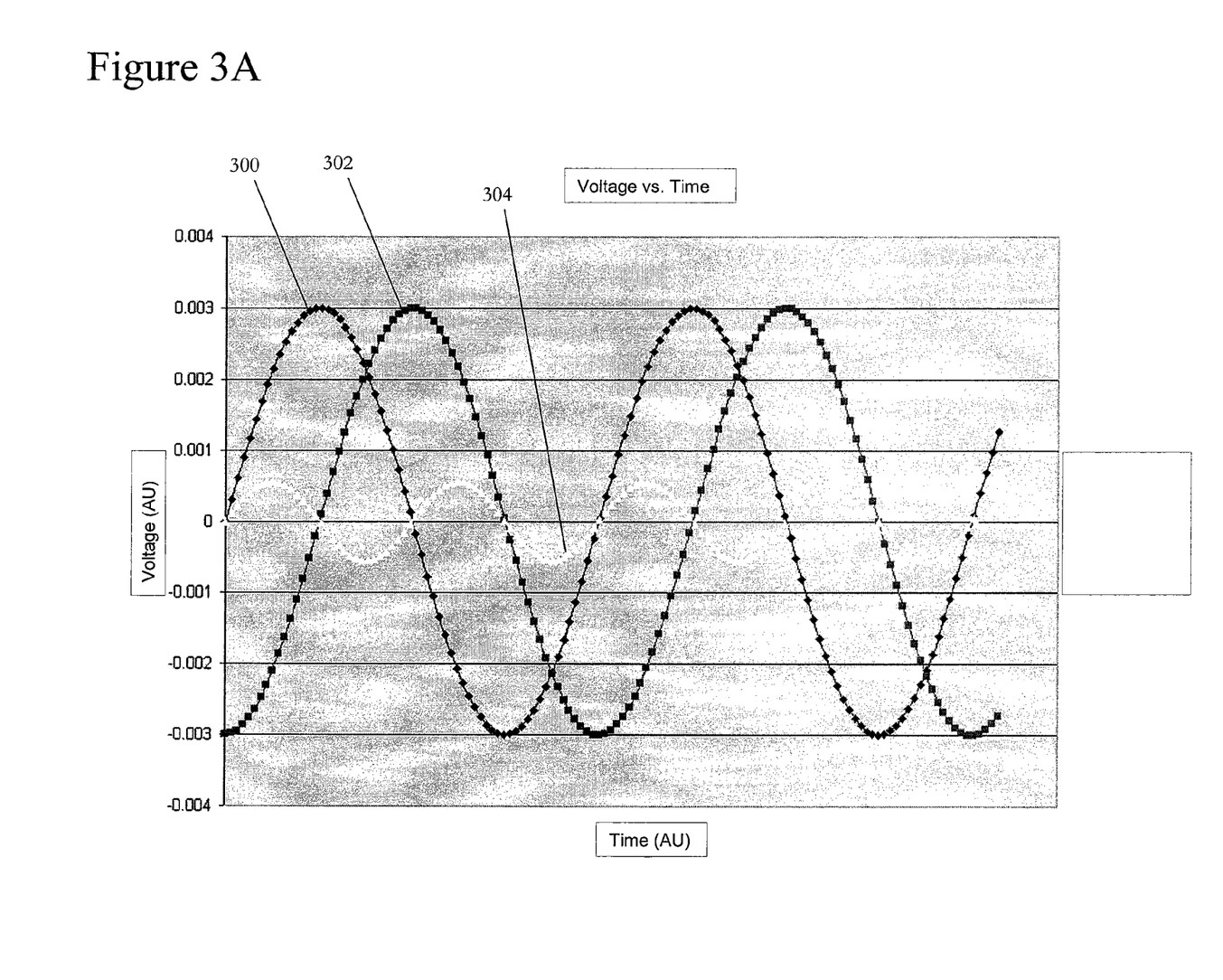
FIGS. 3A and 4A are graphs illustrating exemplary drive signals that may be used to drive the piezoelectric actuators of an exemplary VAM system according to the present invention.
Figure 3B:
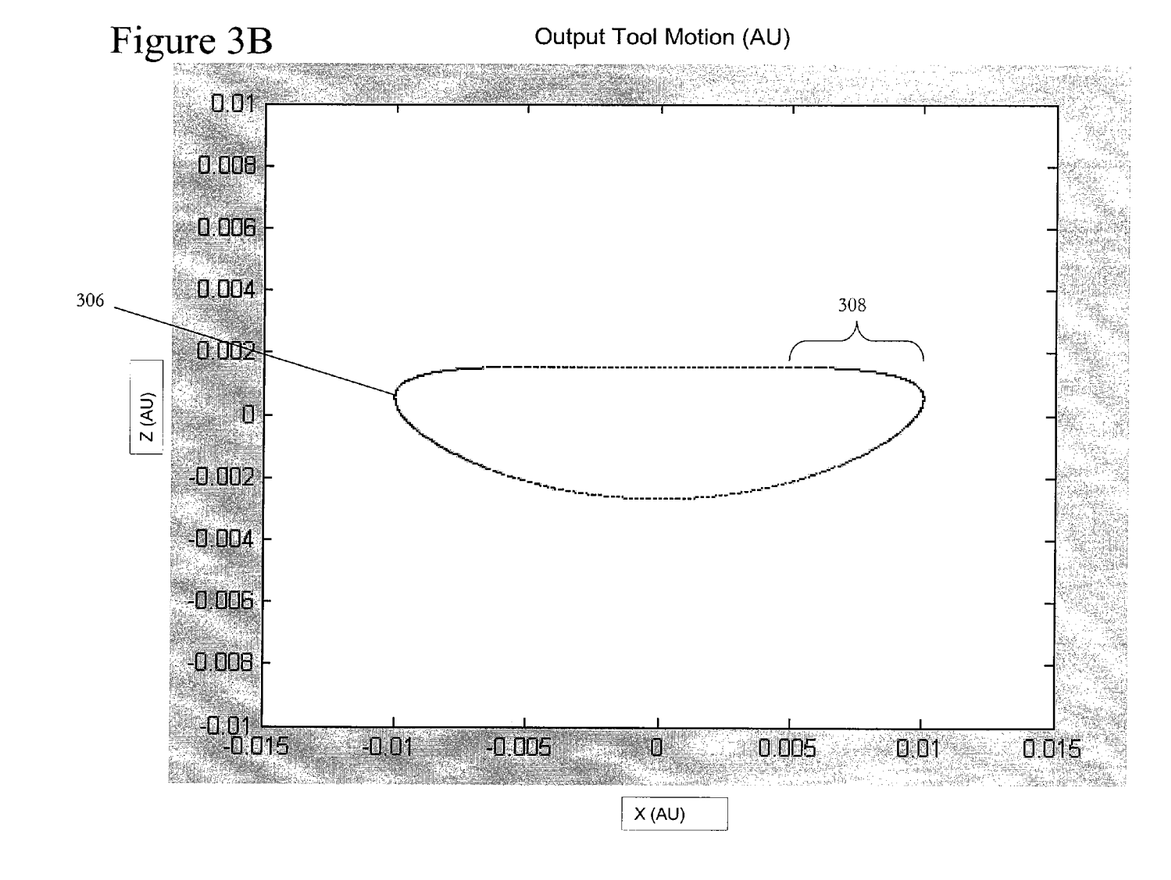
FIG. 3B is a graph illustrating motion of the tip of a cutting tool in an exemplary VAM system according to the present invention driven by the exemplary drive signals of FIG. 3A.

Adding a third PZT actuator to one of these exemplary VAM systems, e.g. perturbation PZT actuator 116, as shown in FIGS. 1 and 2, allows the tool path to be altered to a wider variety of shapes. Desirably, the polarization axis of perturbation PZT actuator 116 is aligned to be up and down the page in FIG. 2, i.e. substantially parallel to the polarization axes of PZT actuators 200 and 202. FIGS. 3B and 4B illustrate exemplary tool paths that may be attained using a three actuator VAM system as shown in FIG. 2, with all three PZT actuators being driven by sinusoidal voltage signals. The addition of the third PZT actuator at the workpiece location, actuating the workpiece in and out of the tool plane will have the same intended effect.

As noted above, the elliptical tool motion of a two actuator VAM system using PZT actuators 200 and 202 as shown in FIG. 2 limits the entrance/transition zone to half the length of the ellipse, when controlled steady-state. By using third, perturbation, PZT actuator 116 (or PZT actuator 104), alternative tool paths may be created to fit desired requirements. FIG. 3A illustrates voltage versus time plots of exemplary drive signals 300, 302, and 304 that may be provided by drive circuitry in vibration control circuitry 118 to drive PZT actuators 200, 202 and 116 (or 104), respectively in an exemplary VAM system using the configurations of FIGS. 1 and 2. These three exemplary drive signal plots are defined by Equation 1. Both the voltage and the time are shown in arbitrary units.

$$V_{300}=0.003\sin(\omega t)$$

$$V_{302}=0.003\sin(\omega t-90°)$$

$$V_{304}=0.00055\sin(2\omega t) \quad (1)$$

In this example, drive signals 300 and 302 oscillate at the same fundamental frequency and have the same stroke amplitude, but these two signals are 90° out of phase with one another. The third driving signal 304, supplied to PZT actuator 116 (or 104) has a lower amplitude and twice the frequency, in this example. One skilled in the art will understand that it is desirable for driving signal 304 to have a frequency that is approximately equal to an integral multiple of the fundamental frequency used to drive the two side-by-side PZT actuators 200 and 202 included in vibration element 114. This allows the tip of cutting tool 110 to traverse approximately the same tool path each cycle. As in this example, the amplitude of the perturbation driving signal 304 is typically less than the amplitude of the driving signals 300 and 302 used to drive vibration element 114; however, the ratio of these amplitudes may be affected by differences in the piezoelectric gain (mm/V) of PZT actuator 116 (or 104) compared to PZT actuators 200 and 202, as well as the tool path effect desired to accomplish a given situation and goal.

FIG. 3B illustrates tool path 306 that may be followed by the tip of cutting tool 110 in the exemplary VAM system of FIG. 1 when the exemplary system is driven by the exemplary driving signals 300, 302, and 304. Without driving signal 304 the tool path would be substantially elliptical; however, by adding driving signal 304, the top side of tool path 306 (i.e. the actual portion of the cycle when the cutting tool is machining the surface) is flattened. This allows for increased time when the tip of the cutting tool is at the desired cutting depth and may improve the surface quality of the machined surface. This may also allow for the use an increased feed rate, while still providing the same peak to valley height, when compared to a similar two PZT actuator VAM system.

Further, the transition zone, the portion of the tool path during which the tip of the cutting tool is plunging into or pulling out of the material, is shortened. For a substantially elliptical tool path the transition zone is half of the length of the ellipse, in this example ~0.01 AU. Transition zone 308 of exemplary tool path 306 is only ~0.0065 AU, however. Thus, the transition zone is reduced by ~35% in this example. The transition zone affects the ability of a VAM system to machine approximately vertical features on a surface. The shorter the transition zone the sharper the edge at the bottom of a cut may be.

Figure 4A:
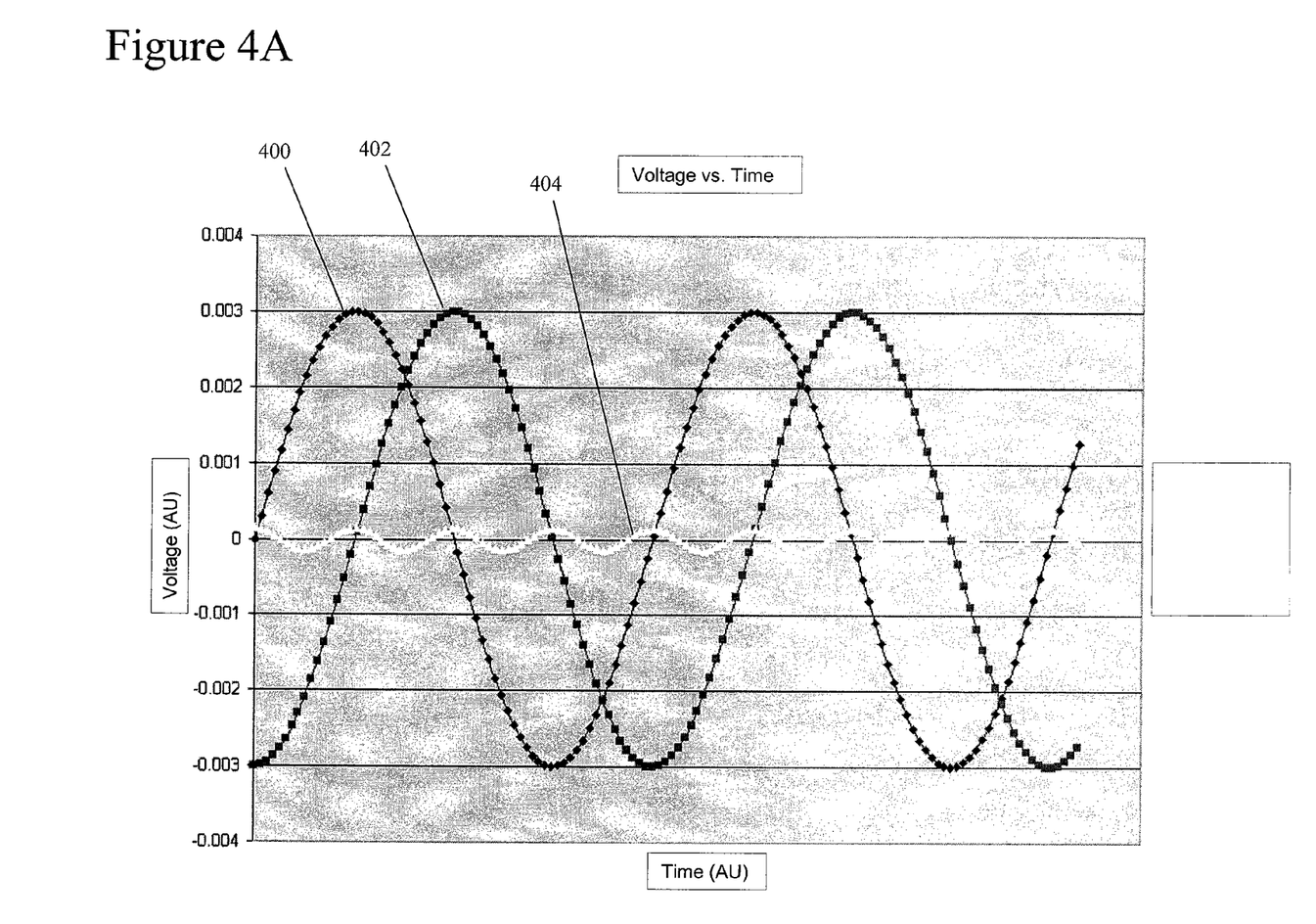
Figure 4B:
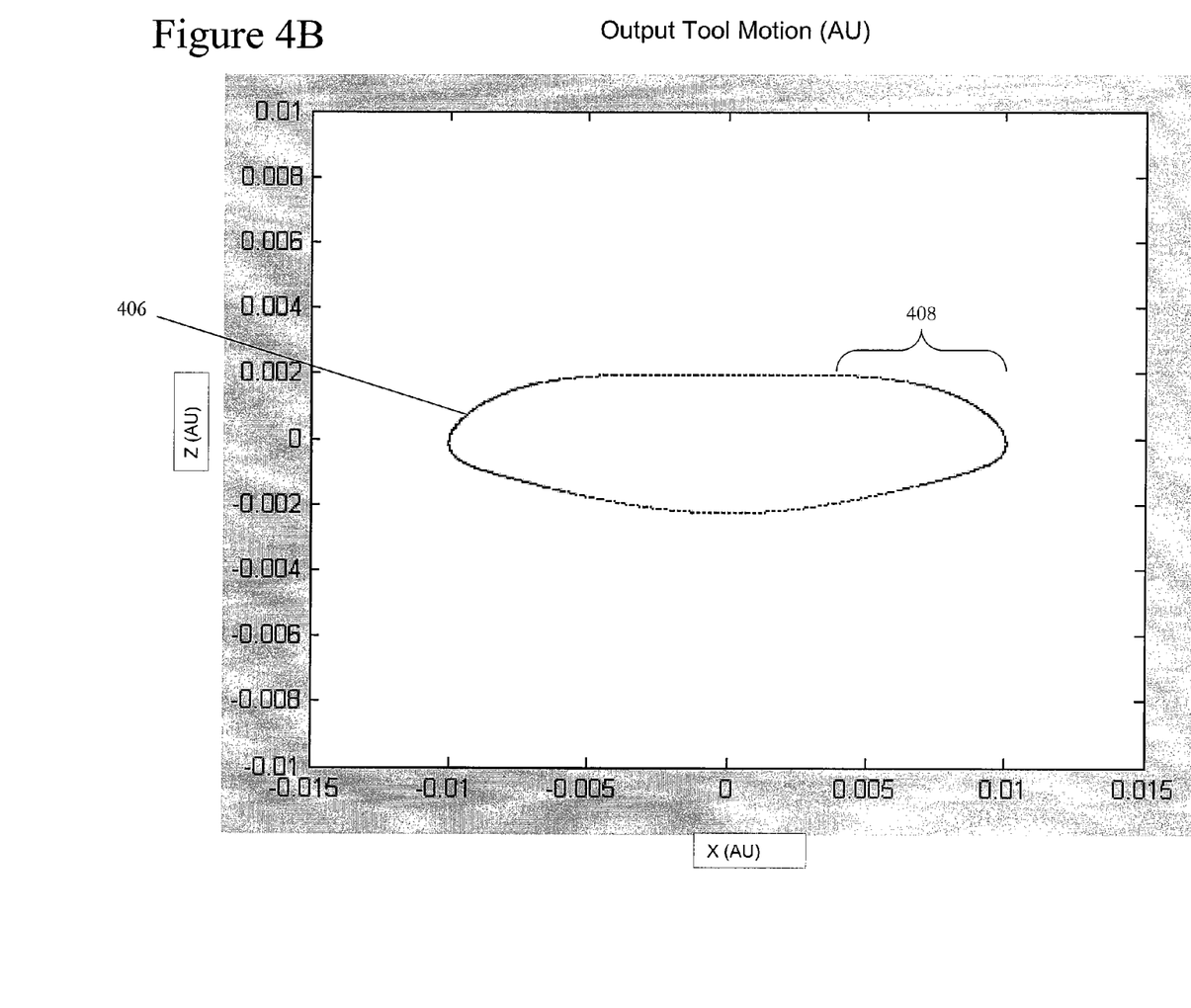
FIG. 4B is a graph illustrating motion of the tip of a cutting tool in an exemplary VAM system according to the present invention driven by the exemplary drive signals of FIG. 4A.

FIG. 4A illustrates voltage versus time plots of another exemplary set of drive signals 400, 402, and 404 that may be provided by drive circuitry in vibration control circuitry 118 to drive PZT actuators 200, 202 and 116 (or 104), respectively in an exemplary VAM system using the configurations of FIGS. 1 and 2. These three exemplary drive signal plots are defined by Equation 2. Both the voltage and the time are shown in arbitrary units.

$$V_{400}=0.003\sin(\omega t)$$

$$V_{402}=0.003\sin(\omega t-90°)$$

$$V_{404}=0.00014\sin(4\omega t+90) \quad (2)$$

In this example, drive signals 400 and 402 are similar to drive signals 300 and 302 in FIG. 3A. The third driving signal 404, supplied to PZT actuator 116 (or 104) has a lower amplitude and four times the frequency.

FIG. 4B illustrates tool path 406 that may be followed by the tip of cutting tool 110 in the exemplary VAM system of FIG. 1 when the exemplary system is driven by the exemplary driving signals 400, 402, and 404. As in the case of tool path 306 in FIG. 3B, the top side of tool path 406 is flattened in FIG. 4B. Transition zone 408 of exemplary tool path 406 is ~0.00775 AU, a reduction of ~22.5% over the elliptical tool path generated using only the two PZT actuators of vibration element 114.

Although the examples of FIGS. 3A, 3B, 4A and 4B include only perturbation signals that are even harmonics of the fundamental frequency used to drive the PZT actuators of vibration element 114, it is contemplated that odd harmonics may be used as well. Other periodic drive signals may also be used to drive perturbation PZT actuators 104 and/or 116. Additionally, by using both perturbation PZT actuator 104 and perturbation PZT actuator 116, more complex tool paths may be created. Computational software, such as MATLAB may be used to determine the amplitudes, frequencies, and waveforms needed to create a desired tool path.

As discussed above, the transition zone of the tool path affects the ability of a VAM system to machine approximately vertical features on a surface while operated in a 'steady-state.' Further, the length of the transition zone, and the 'flatness' of the cutting portion of the tool path, affect the maximum feed distance per cycle of the VAM system without sacrificing surface quality.

It is also noted that vibration control circuitry 118 may include bias circuitry to provide a bias signal to perturbation PZT actuator(s) 104 and/or 116 to dynamically control the distance between the tip of cutting tool 110 and workpiece 108 (or to control the depth of the cut made by cutting tool 110 as workpiece 108 is machined). It is noted that using perturbation PZT actuator(s) 104 and/or 116 for dynamic control of the machining process may lead to changes to the VAM system parameters (changing temperature, vibration, force, etc), and may adversely affect the resulting surface quality. However, the benefits of this dynamic control may outweigh the possible adverse effects, particularly at the beginning and ending of a cutting pass. The bias signal may be applied as a step to perturbation PZT actuator(s) 104 and/or 116 at the beginning and/or ending of cutting passes to create features with very nearly vertical edges. During the cutting passes, the bias signal may be substantially constant, and a periodic perturbation signal may be applied to perturbation PZT actuator(s) 104 and/or 116. Alternatively, the bias signal may be varied during cutting passes to allow for surface features having nanoscale heights to be formed or for VAM of non-planar surfaces, such as lenses or lens molds.

Another exemplary form of dynamic control that may be utilized by exemplary VAM systems according to the present invention involves varying the phase and/or amplitude of the perturbation signal(s) during the machining process. Such dynamic control allows the tool path to be altered according to the location, which may be used to vary the surface quality of different regions of the workpiece and/or to reduce the lead-in and lead-out zones of the exemplary VAM system.

FIG. 5A illustrates a surface of workpiece 108 being machined using a prior art VAM system with substantially elliptical tool path 500. In this example, substantially elliptical tool path 500 has been scaled such that, if a maximum surface variation 502 of 1 nm is desired, the maximum feed distance 504 during one cycle of the tool path is 0.7 μm. Substantially elliptical tool path 500' illustrates how far the tool path has shifted as cutting tool 110 moves from its initial position to its position one cycle later (cutting tool 110' in dashed lines). One skilled in the art will understand that, because of the feed motion, the pattern machined on the surface will be slightly elongated; however the approximations shown in FIGS. 5A-C are illustrative of the differences associated with different tool paths.

Figure 5B:
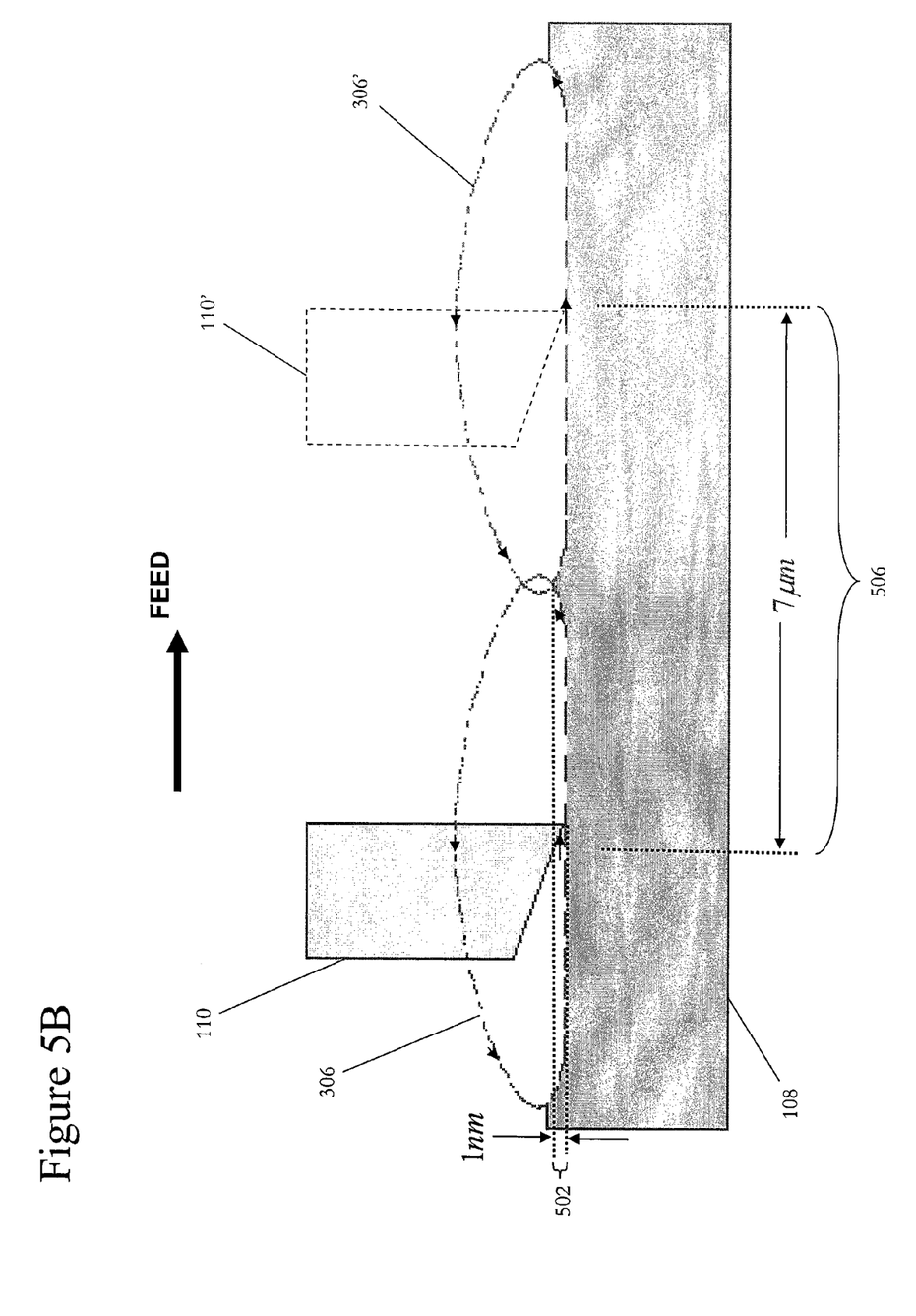
FIGS. 5B and 5C are side plan drawings illustrating exemplary surface finishes and feed rates attained using an exemplary VAM system according to the present invention.
Figure 5C:
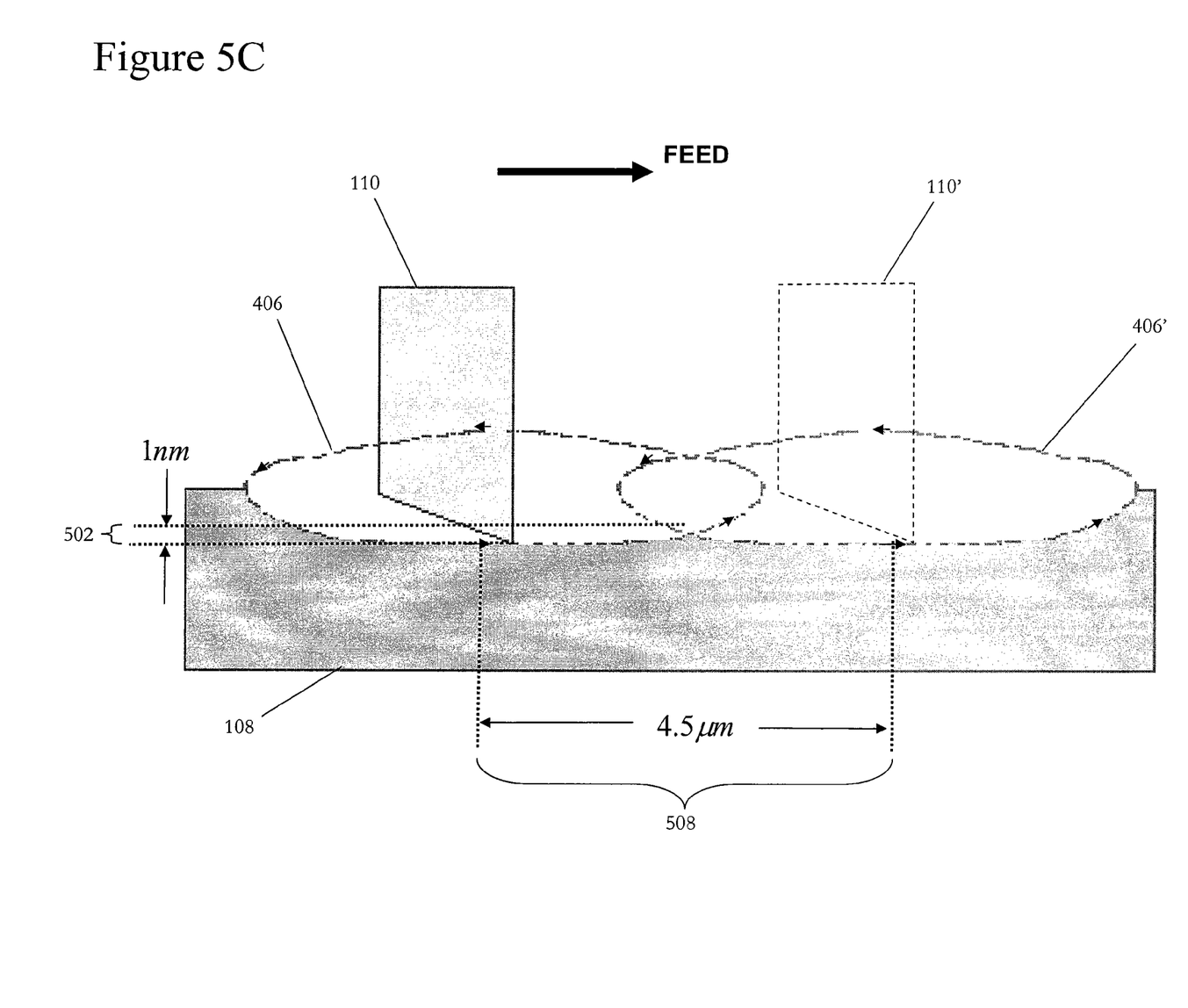

FIGS. 5B and 5C illustrate how exemplary tool path 306 and 406 may affect the feed rate and surface quality. Tool paths 306' and 406' (of respective FIGS. 5B and 5C) illustrate how far the corresponding tool path has shifted as cutting tool 110 moves from its initial position to its position one cycle later. Because the cutting portions (i.e. when the tip of cutting tool 110 is 'in' workpiece 108) of tool paths 306 and 406 are substantially 'flat,' the peak-to-valley effect would be much less than an ellipse, which may allow for a faster feed rate. As illustrated in FIG. 5B, assuming the same desired maximum surface variation 502 of 1 nm, the maximum feed distance 506 during one cycle of tool path 306 is increased to 7 μm. FIG. 5C illustrates the effect of using exemplary tool path 406. The maximum feed distance 508 during one cycle of tool path 406 is 4.5 μm.

Thus, varying the shape of the tool path using perturbation PZT actuator(s) 104 (and/or 116) may desirably reduce the transition zone and may allow for faster machining speed without sacrificing surface quality.

It is also noted that piezoelectric materials produce a voltage when subjected to stress along their polarization axis. Therefore, it is further contemplated that one of PZT actuators 104 or 116 in the exemplary system of FIG. 1 may be used as a sensor to determine residual forces near the workpiece 108. This PZT actuator may be electrically coupled to sensor circuitry in vibration control circuitry 118 to receive a signal from the PZT actuator that is indicative of the pressure between the tip of cutting tool 110 and workpiece 108. Too much force may damage the workpiece, while too little force may indicate inefficient machining of the workpiece or a problem with the system. Thus, this force measurement may desirably be used to optimize the machining process.

Figure 8:
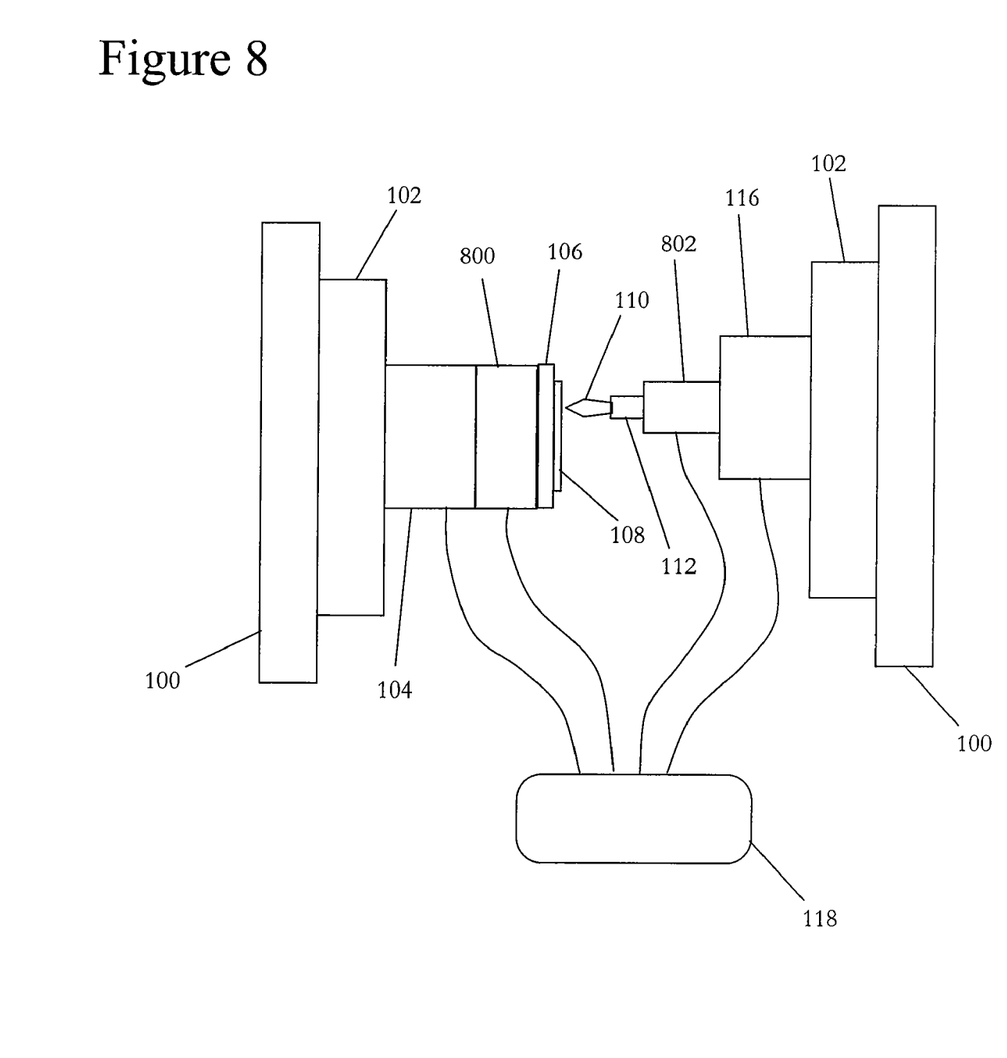
FIG. 8 is a side plan drawing illustrating another exemplary VAM system according to the present invention.

FIG. 8 illustrates another exemplary VAM system according to the present invention. This exemplary embodiment uses two orthogonally mounted PZT actuators that are operated independently to generate a substantially elliptical tool path. VAM systems using two such independently operated PZT actuators are disclosed in U.S. patent application Ser. No. 11/221,041, METHOD AND APPARATUS FOR VIBRATION MACHINING WITH TWO INDEPENDENT AXES (which is assigned to Matsushita Electric Industrial Co., Ltd.), which is incorporated by reference herein.

These two independently operated, and orthogonally mounted PZT actuators correspond to vibration element 114 of the exemplary VAM system of FIG. 1. In exemplary embodiments of the present invention, each of these PZT actuators is desirably drive by a sinusoidal signal generated by drive circuitry 118. These signals desirably have the same frequency, but different phases and possibly different amplitudes.

The PZT actuators may be mounted together as vibration element 800 and driven to translate workpiece 108 along a substantially elliptical path relative to cutting tool 110, or they may be mounted together in vibration element 802 and driven to translate cutting tool 110 along a substantially elliptical tool path. Alternatively, one PZT actuator may be mounted in vibration element 800 to oscillate workpiece 108 in one direction relative to cutting tool 110 and the other PZT actuator may be mounted in vibration element 802 to oscillate cutting tool 110 in an orthogonal direction. Together these translations cause a substantially elliptical relative motion between workpiece 108 and cutting tool 110.

In exemplary embodiment of the present invention, these two PZT actuators are desirably driven in a 'steady-state' to produce a substantially elliptical relative motion between workpiece 108 and cutting tool 110 throughout the machining process. However, the exemplary VAM system of FIG. 8 also includes perturbation PZT actuator(s) 104 and/or 116. The perturbation PZT actuator(s) 104 and/or 116 may be operated in a 'steady-state' as well leading to an improved relative motion between workpiece 108 and cutting tool 110, as described above with reference to the exemplary VAM system of FIG. 1. Additionally, perturbation PZT actuator(s) 104 and/or 116 may be used to provide dynamic control of the VAM process, as described above with reference to the exemplary embodiments of FIG. 1.

The present invention includes a number of exemplary VAM systems including three or four PZT actuators. Although the invention is illustrated and described herein with reference to specific embodiments, it is not intended to be limited to the details shown. Rather, various modifications may be made in the details within the scope and range of equivalents of the claims and without departing from the invention. In particular, one skilled in the art may understand that the invention is not limited to VAM systems with four or fewer PZT actuators and that many other features of the various specifically illustrated embodiments may be mixed to form additional exemplary VAM systems also embodied by the present invention.

What is claimed:

1. A vibration assisted machining (VAM) system, comprising:
   a frame;
   a vibration element mechanically coupled to the frame, the vibration element including a first piezoelectric (PZT) actuator and a second PZT actuator adapted to generate a substantially elliptical tool path in a vibration plane of the VAM system;
   a cutting tool holder connected to the vibration element;
   a workpiece holder coupled to the frame;
   a motion stage configured to position at least one of the cutting tool holder and the workpiece holder; and
   a further vibration element comprising a third PZT actuator coupled between the frame and one of:
   the vibration element; or
   the workpiece holder;
   wherein the third PZT actuator is independent of the motion stage and is coupled to the frame such that a polarization axis of the third PZT actuator is substantially in the vibration plane and substantially perpendicular to a feed direction of the VAM system.

2. A VAM system according to claim 1, wherein:
the first PZT actuator and the second PZT actuator of the vibration element are mounted in a side-by-side configuration;
the vibration element further includes a T-linkage coupling the first PZT actuator and the second PZT actuator to the cutting tool holder; and
the first PZT actuator and the second PZT actuator are coupled to the frame such that polarization axes of the first PZT actuator and the second PZT actuator are substantially parallel to the polarization axis of the third PZT actuator.

3. A VAM system according to claim 1, wherein:
the vibration element further includes a cross-void flexure coupling the first PZT actuator and the second PZT actuator to the cutting tool holder;
the first PZT actuator and the second PZT actuator of the vibration element are mounted in an orthogonal configuration; and
the first PZT actuator and the second PZT actuator are coupled to the frame such that:
a polarization axis of the first PZT actuator is substantially parallel to the polarization axis of the third PZT actuator; and
a polarization axis of the second PZT actuator is substantially perpendicular to the polarization axis of the third PZT actuator.

4. A VAM system according to claim 1, wherein:
the vibration element further includes a two-dimensional transverse vibration beam that has two nodes and an end section that is not between the two nodes, the two-dimensional transverse vibration beam is coupled to:
the frame at the two nodes; and
the cutting tool holder at the end section; and
the first PZT actuator and the second PZT actuator of the vibration element are coupled to the two-dimensional transverse vibration beam in an orthogonal configuration at a center point between the two nodes such that:
a polarization axis of the first PZT actuator is substantially parallel to the polarization axis of the third PZT actuator; and
a polarization axis of the second PZT actuator is substantially perpendicular to the polarization axis of the third PZT actuator.

5. A VAM system according to claim 1, further comprising:
drive circuitry electrically coupled to the vibration element and the third PZT actuator, the drive circuitry adapted to provide a first drive signal for driving the first PZT actuator, a second drive signal for driving the second PZT actuator, and a third drive signal for driving the third PZT actuator;
wherein:
the first drive signal has a fundamental frequency and a first stroke amplitude;
the second drive signal has the fundamental frequency and a second stroke amplitude;
the first stroke amplitude, the second stroke amplitude, and a relative phase of the first drive signal and the second drive signal are selected such that a tip of a cutting tool mounted in the cutting tool holder follows the substantially elliptical tool path in the vibration plane relative to the vibration element; and
the third drive signal has a perturbation frequency approximately equal to N times the fundamental frequency, where N is an integer greater than 1, and a perturbation amplitude less than a lesser of the first stroke amplitude and the second stroke amplitude.

6. A VAM system according to claim 1, further comprising bias circuitry electrically coupled to the third PZT actuator, the bias circuitry adapted to provide a bias signal to dynamically control a distance between the vibration element and the workpiece holder.

7. A VAM system according to claim 1, wherein the motion stage comprises:
a feed stage coupled between the frame and the vibration element to translate the vibration element in the feed direction of the VAM system; and
a step stage to step the cutting tool holder relative to the workpiece holder in a direction substantially perpendicular to the feed direction and substantially normal to the vibration plane of the VAM system at an end of a feed line, the step stage being coupled between the frame and one of:
the vibration element; or
the workpiece holder.

8. A VAM system according to claim 1, wherein the motion stage comprises:
a feed stage coupled between the frame and the workpiece holder to translate the workpiece holder in a direction opposite to the feed direction of the VAM system; and
a step stage to step the cutting tool holder relative to the workpiece holder in a direction substantially perpendicular to the feed direction and substantially normal to the vibration plane of the VAM system at an end of a feed line, the step stage being coupled between the frame and one of:
the vibration element; or
the workpiece holder.

9. A VAM system according to claim 1, further comprising a fourth PZT actuator coupled between the frame and one of:
the vibration element; or
the workpiece holder.

10. A VAM system according to claim 9, further comprising:
drive circuitry electrically coupled to the vibration element, the third PZT actuator, and the fourth PZT actuator, the drive circuitry adapted to provide a first drive signal for driving the first PZT actuator, a second drive signal for driving the second PZT actuator, a third drive signal for driving the third PZT actuator, and a fourth drive signal for driving the fourth PZT actuator;
wherein:
the first drive signal has a fundamental frequency and a first stroke amplitude;
the second drive signal has the fundamental frequency and a second stroke amplitude;
the first stroke amplitude, the second stroke amplitude, and a relative phase of the first drive signal and the second drive signal are selected such that a tip of a cutting tool mounted in the cutting tool holder follows the substantially elliptical tool path in the vibration plane relative to the vibration element;
the third drive signal has a first perturbation frequency approximately equal to N times the fundamental frequency, where N is an integer greater than 1, and a first perturbation amplitude less than a lesser of the first stroke amplitude and the second stroke amplitude; and
the fourth drive signal has a second perturbation frequency approximately equal to N times the fundamental frequency, where N is an integer greater than N, and a second perturbation amplitude less than or equal to the first perturbation amplitude.

11. A VAM system according to claim 1, further comprising sensor circuitry electrically coupled to the third PZT actuator, the sensor circuitry adapted to receive a signal from the third PZT actuator indicative of a force between a tip of a cutting tool mounted in the cutting tool holder and a workpiece mounted in the workpiece holder.

* * * * *